United States Patent Office 3,084,754
Patented Apr. 9, 1963

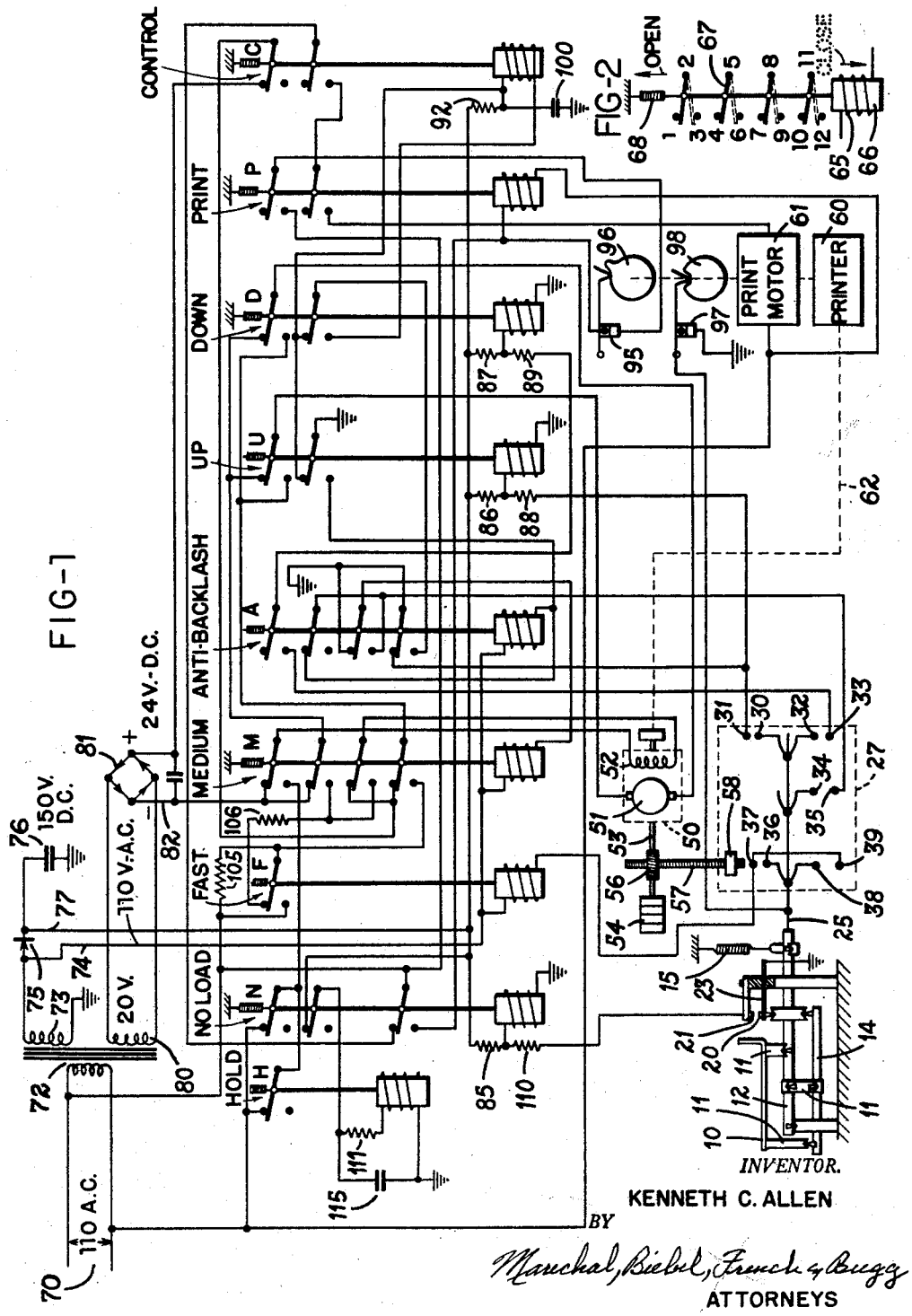

3,084,754
COMPUTING SCALE
Kenneth C. Allen, Dayton, Ohio, assignor to The Hobart Manufacturing Company, Troy, Ohio, a corporation of Ohio
Original application Aug. 24, 1953, Ser. No. 376,136. Divided and this application Apr. 25, 1960, Ser. No. 24,396
2 Claims. (Cl. 177—210)

This invention relates to computing scales and more particularly to a power operated scale for computing, indicating, and providing a printed record of a weighing transaction at a selected unit price.

It is generally an object of the invention to provide a scale having power operated means for actuating indicators, printing mechanism, and the like, which responds quickly and accurately to the weighing operation of the scale and which develops adequate power for operating the indicator, or printing a ticket, as may be desired, to provide a record of the transaction.

It is also an object to provide controls for operating the power drive mechanism swiftly, without hunting, and providing for the accurate and rapid stopping of the drive when the balance point is reached.

It is a further object to provide for transferring the source of electrical energizing from a high speed to a low speed connection, including preferably an intermediate drive speed also, and for dynamically braking the drive motor when decelerating to a stop condition.

Other objects and advantages will become apparent from the following description, the accompanying drawings, and the appended claims.

In the drawings—

FIG. 1 is a combined schematic and diagrammatic view showing the essential features of the scale mechanism in association with the power drive, the indicating and printing mechanism, and the circuits which provide for the desired operations; and FIG. 2 is an illustrative view indicating the terminology and nomenclature employed in connection with the several relays involved in the system.

Referring to the drawings, which disclose a preferred embodiment of the invention, the scale is shown diagrammatically in FIG. 1 as comprising a platter 10 for receiving the article to be weighed. The platter is supported through vertical members 11 on a double lever system comprising the main lever 12, floating links 13 and secondary lever 14. Any other lever arrangement such as a single lever and check link may be employed if desired, and likewise any suitable form of counterbalance may be used, a spring 15 being shown as connected to the lever and forming therewith the essential elements of the weighing mechanism.

A movable contact 20 cooperates with fixed contact 21 forming a switch that is open when the scale is without weight in the platter. As shown such contact 20 is associated with the fulcrum strut 22 of the secondary lever and is carried on a light spring arm 23 insulated from the scale but could be placed at any location between the platter and its supports. Application however of a weight in excess of a predetermined small amount to the platter 10 will cause contacts 20 and 21 to close and remain closed as long as the weight is on the platter. As shown contact 20 is grounded to the frame of the mechanism.

The lever 12 has an extension arm 25 which carries a series of contacts each mounted on spring arms, and arranged to travel upwardly or downwardly in accordance with the deflections of the lever. These spring contacts are mounted adjacent cooperating contacts carried on a contact carrying assembly 27 which functions as a follow-up device. The contacts on arm 25 include an upper contact 30 cooperating with a closely spaced contact 31 on assembly 27, and a lower contact 32 similarly cooperating with a closely spaced contact 33 on assembly 27. Upon slight upward movement of arm 25 relative to assembly 27 it will be evident that contacts 30 and 31 will close, and conversely on slight downward movement contacts 32 and 33 are closed.

Arm 25 also carries lower contact 34 arranged to cooperate with contact 35 on assembly 27, the spacing between contacts 34 and 35 being somewhat greater than that between contacts 32 and 33 and thereby requiring a greater deflection of the lever before closing of the circuit takes place. In addition, arm 25 carries upper contact 36 cooperating with contact 37, and lower contact 38 cooperating with contact 39 on assembly 27, the spacing between such respective pairs being still greater so that they will not close until a further deflection of the lever takes place.

The power operating mechanism includes a drive motor 50 having an armature 51 and a field 52. The motor has a shaft 53 which is directly connected to an indicator or counter shown diagrammatically at 54. Such indicator may be of the type having multiple drums on which figures appear corresponding to the amount of rotation of the shaft, to furnish a direct reading indication varying in relation to the weight of the article on the scale.

Shaft 53 operates through worm gearing 56 to drive a screw 57 which turns on nut 58 to raise or lower the contact assembly 27. Thus in response to the operation of motor 50, the contact assembly 27 is raised or lowered, carrying with it the series of contacts 31, 33, 35, 37 and 39 which function as a follow-up device, as will be more fully described hereinafter.

A printer is indicated diagrammatically at 60 operated by print motor 61 and connected through shaft 62 with the drive motor 50 so that the printer will be properly set in accordance with weight, through the turning of motor shaft 62, the amount of rotation of which is directly related to the weight of the article.

For purposes of illustration and simplicity of nomenclature, a typical relay is illustrated in FIG. 2, similar to the several relays embodied in the circuit diagram of FIG. 1. Each relay comprises a solenoid or coil 65 which upon being energized attracts its armature 66, pulling the armature down, and actuating the relay to what is identified as its closed position. One or more switch arms 67 are connected to the armature and are considered as pivoting about their right hand ends, moving from their open or full line position to their closed or dotted line position in response to such energization. Spring means 68 normally returns the switch arms to their upper or open positions. Further, the contacts are designated in the manner shown, that is, the topmost switch arm in the open position completes a circuit between contacts 1 and 2, and in the closed position completes a circuit between contacts 2 and 3. The second switch arm extends from contact 5 and moves from open position against contact 4 to closed position against contact 6, similar connections being established by each of the switch arms of the relay.

The main power supply is indicated at 70 which may suitably be an ordinary 110 volts A.C. source such as is available in locations where the scale would generally be used. A transformer 72 is provided having one secondary 73 which produces a supply source 74 of 110 volts A.C. separate from the main power source and such that one side thereof can be grounded to the frame of the scale without danger of shock with the other side furnishing power for operating controls. A source of high voltage D.C. is desired, and for this purpose a selenium rectifier 75 is connected through condenser 76 to ground, thereby furnishing a source 77 of approximately 150 volts D.C. likewise for control purposes. A lower voltage direct current supply is likewise desired, and to provide this the transformer also incorporates another secondary winding 80 developing about 20 volts which supplies the full wave rectifier 81, the opposite terminals of which furnish a source 82 of about 24 volts direct current as used in the system.

Assuming now that the scale is unloaded and with power supplied through the various circuits, the following conditions exist. Since there is no load on the platter, contacts 20 and 21 are open, so that an energizing circuit is completed for the coil of No Load relay N from source 77 through series resistor 85 and through coil N to ground. The N relay is thus closed. The Hold relay H is open because its only source of power is through contacts N4 and N5, which circuit is broken. Fast relay F is open since its energizing circuit is broken at contacts 36, 37 and 38, 39. Up relay U and Down relay D are both closed because they are energized from source 77, through series resistors 86 and 87 respectively, through the operating coils of the relays to ground. It will be noted that relay U has a resistor 88 connected in parallel with its coil but this resistor is ineffective because its circuit is broken at switch contacts 30, 31. Relay D similarly has a resistor 89 in parallel with its operating coil but it also is ineffective because its circuit is opened at switch contacts 32, 33.

The Anti-Backlash relay A is closed because it is energized from source 74 through its operating coil and through relay contacts U6 and U5 to ground. The Medium relay M is open because its energizing circuit is through contacts A9 and A8 which are closed, and through switch contacts 34 and 35 which are open. Control relay C is closed because a circuit is completed from source 77 through resistor 92, the operating coil of relay C, contacts D6 and D5, through contacts A12 and A11 to ground.

Printing relay P is closed through a circuit which is completed from one side of power source 70, switch contacts N8 and N9, through the coil of relay P and back to the other side of source 70. Upon closing, relay P locks itself in through a circuit from the same side of source 70, contacts P3 and P2, through normally closed contacts 95 of a cam switch operated by cam 96 controlled by the print motor 61, thereby providing a bypass for the contacts of relay N as long as the cam switch contacts 95 remain closed.

With both relays U and D in closed position, both sides of the motor armature 51 are connected together, and thus the motor does not run. The field circuit to the motor field 52 is likewise open because its energizing circuit is broken at contacts C1 and C2.

*Weighing Operation*

Assuming now that a weight or load is applied to platter 10, and that the amount of the weight is small, deflection of lever 12 occurs with corresponding downward travel of arm 25 to an extent sufficient only to cause the closing of contacts 32 and 33, but insufficient deflection to cause the closing of either contacts 34, 35 or contacts 38, 39. Closing of contacts 32, 33 completes a circuit from ground, through closed contacts 97, contacts 32, 33 and contacts A3, A2 to resistor 89 which thus reduces the potential applied to the coil of relay D.

After the above indicated short delay period, relay D opens, and in doing so its contacts D5 and D6 open the ground circuit for the coil of relay C allowing this relay to open at approximately the same instant. With relays D and C in open position, the low voltage D.C. source 82 supplies the motor field through a circuit from the plus side thereof through contacts C1, C2, contacts M7, M8, through the field winding 52, contacts M2, M1 to the negative side of the source. The motor field is thus energized. Likewise the armature is energized from the same source, through a circuit from the plus side, contacts C1, C2, contacts M10, M11, contacts U3, U2 to the armature, contacts D2 and D1, and contacts M5, M4 to the negative side of the line. The motor is thus energized and runs at slow speed in the direction to turn shaft 53 and to operate screw 57 in the direction to move contact assembly 27 in the downward direction. As this movement continues, it is recorded in counter 54 and likewise provides for actuation of printer 60.

Such conditions continue until the lever stabilizes at a balance position and until the downward travel of the contact assembly 27 results in the opening of switch contacts 32, 33. Promptly upon the opening of these latter contacts the shunt circuit through resistor 89 is broken and the full voltage of source 77 is applied through resistor 87 to the coil of relay D, causing this relay to close immediately. In so doing, the circuit through the armature 51 is broken by the opening of contacts D1 and D2 and with the closing of contacts D2 and D3, the armature is short circuited upon itself through contacts U2 and U3. Thus the scale automatically senses arrival at the balance condition, whatever interval may be required for that operation, and at this time relays U and D are both operated, thereby setting up the conditions for the operation of relay C which in turn controls the printing operation.

The closing of contacts D5 and D6 connects the operating coil of relay C to ground through a circuit including contacts A12 and A11 but a condenser 100 is connected in shunt to the coil and hence the coil does not receive operating voltage immediately, and there is a short time delay during which the charge builds up on condenser 100 through resistor 92. Such condenser 100 has previously been maintained in a discharged condition by a grounded circuit through contacts U4 and U5 or D4 and D5 in combination with A12 and A11, or both. After such delay, which may be of the order of one-half second, the potential has risen sufficiently and relay C closes. Until it does close, however, the energizing circuit for the motor field coil 52 remains as previously described through contacts C1 and C2 and hence a high degree of dynamic braking is produced, causing the motor to come quickly to a stop. This delay not only provides for the dynamic braking but also provides a short period to assure that complete stability of the weighing and power drive mechanisms has been attained. The time delay in the operation of relay C requires that the scale remain in balance for this brief interval before the printing operation begins and if for any reason there is a disturbance the time interval is reestablished. Upon operation, relay C conditions the circuit for the prompt initiation of the printing operation without further delay or any manual operation. It will be seen from the above that it is impossible for the scale to print unless it is in balance and that if anything disturbs that balance or if an attempt should be made to tamper with the weight, relay C will not operate and the printing operation cannot take place.

*Printing Operation*

In response to the closing of control relay C, its contacts C5 and C6 supply power through a circuit from one side of source 70, contacts N8 and N7 of relay N which is open, contacts C5 and C6, contacts P5 and P6 to the printer motor 61 and back to the other side of source 70. This actuates the motor to perform a printing cycle causing the printing of a ticket showing the weight corresponding to the condition established by the turning of shaft 62. Immediately upon the start of the printing operation contacts 97 are opened by the action of cam 98 thus disabling the entire series of control contacts 30-39 so that nothing which takes place on the printer or weighing mechanism of the scale will affect the weight indication or the cycle of printing, and hence the scale and the power drive thereof remain at rest regardless of what may be done to the load on the platter.

This likewise disables the U and D relays so that nothing can happen to disturb the closed condition of the C relay during the printing operation which thus continues through one cycle until cam 96 opens contacts 95. When this occurs the locking circuit for the coil of relay P is broken and relay P opens and remains open even during the coasting of the printing motor which does carry far enough to result in the closing of switch contacts 95. The printer is now restored to its home position and contacts 97 have closed and the scale is ready to be operated or to start operating automatically if the balance condition is disturbed. The printer, however, cannot recycle until the load has been removed from the platter thus opening contacts 20 and 21 and causing the N relay to close, resetting and locking the P relay. Furthermore the printer will not operate at zero load even though the scale is in balance because of the closed position of the N relay which breaks the printer source of power through contacts N7 and N8.

Thus the system prevents operation of the printer at zero load, prevents operation of the printer while the scale is in an unbalanced position, prevents operation of the scale while the printer is in action, and prevents recycling of the printer until the weight has been removed from the platter.

Weighing of Larger Loads

Assuming now that a somewhat larger load has been placed on the platter resulting in the deflection of lever 12 and arm 25 sufficiently to cause the closing of both contacts 32, 33 and 34, 35. Closing of contacts 32, 33 provides for the closing of relay D after the previously described short delay interval. Closing of contacts 34, 35 completes an energizing circuit for the coil of relay M which may be traced from source 74 through the operating coil of relay M, contacts A8, A9 and contacts 35, 34 to ground through closed contacts 97. Relay M thereupon closes resulting in changing the connections to motor 50 from a direct current shunt connection to a modified series motor directly connected to the A.C. source 70. This circuit may be traced from one side of source 70, resistor 105, contacts M12, M11, contacts D3 and D2, the armature 51 of the motor, contacts U2, U1, contacts M5, M6, M9, M8, the field winding 52 of the motor, contacts M2, M3, contacts H2 and H1, or N2 and N1, to the other side of the line. Since relay F is open, resistor 106 is also connected through contacts F1 and F2 in such a manner that it is in shunt across the armature 51, resistor 105 being in series with the combination and with the motor field and armature being in series with each other. This connection results in a slower speed operation of the motor than would be the case if resistors 105 and 106 were not present, but a substantially faster operation than when the motor was connected for slow speed. The series resistor 105 reduces the speed of the series connected motor in the normal manner and the resistor 106 connected in shunt to the armature increases the torque at such lower speed by reason of creating a stronger field. Under these conditions the system operates at medium speed with the motor connected as a series motor and traveling substantially faster than its slow speed condition.

Application of Maximum Load

Application of a still greater load to the scale results in the closing of contacts 38, 39 which complete an energizing circuit for the coil of relay F from source 74 through the coil, through contacts 38, 39 and closed contacts 97 to ground. Upon the closing of relay F, its contacts F2 and F3 short circuit resistor 105, and the opening of contact F1 opens the circuit to resistor 106. This causes motor 50 to operate at maximum or full speed as a series connected motor.

Dynamic Braking

As the contact assembly 27 travels downward at maximum speed, the following sequence of operations takes place. As the balance point is approached, contacts 38 and 39 open, resulting in the opening of relay F. This results in the reinsertion of series resistor 105 and in the shunt connection of resistor 106 across the motor armature. In such connection resistor 106 serves as an effective dynamic brake and quickly slows the travel of the motor from high speed to medium speed. Further travel of the motor continues at medium speed until contacts 34 and 35 open, which results in the opening of relay M, disconnecting the motor from its A.C. supply source 70, and reconnecting it for operation as a D.C. shunt motor to source 82. Because of the shunting effect of the field on the armature dynamic braking again takes place, quickly slowing the motor from medium to slow speed. Further travel continues at slow speed, with the final stopping of the motor with dynamic braking in response to the opening of contacts 32, 33 at the balance point, in the manner described above. Also as described the printing operation then takes place.

Removal of Load From the Scale

Upon removal of the load from the scale a sequence takes place similar to that described above in connection with the Anti-Backlash feature, and motor 50 travels in the reverse or upward direction at either medium or fast speed. In addition, the contacts 20 and 21 will open if the entire load is removed.

The invention thus provides a novel and highly satisfactory scale mechanism which affords ready and accurate response in relation to the weight, which develops adequate power for the operation of printers and the like, and particularly which operates swiftly and with adequate power but which also stops accurately at the proper position with minimum hunting. Other advantages of this scale mechanism are described in detail in my application Serial No. 376,136, filed August 24, 1953, now Patent No. 2,948,523 of which the present application is a division.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A power operated weighing scale having weighing mechanism and a lever adapted to occupy a no-load position and to be deflected away from said position in response to the application of a load to the scale, comprising a plurality of contacts movable with said lever, a follow-up member carrying contacts cooperating respectively with said lever contacts, respective pairs of said contacts being arranged with different spacings from each other providing for closing of a more closely spaced pair upon a small deflection of said lever and the closing of a more widely spaced pair upon a greater deflection of said lever, an electric drive motor including an armature and a field winding and having a shaft the rotation of which corresponds to the weight, means providing sources of relatively high voltage alternating current and relatively low voltage direct current respectively, means connecting said motor shaft to move said follow-up member in response to the rotation of said shaft, circuit means including said widely spaced contacts connected to complete a high voltage alternating current circuit with said armature and said field winding in series in response to closing of said widely spaced contacts, and circuit means including said closely spaced contacts connecting said armature and said field winding in shunt and receiving power from said direct current source in response to closing of said closely spaced contacts.

2. A power operated weighing scale having a weighing mechanism and a lever adapted to occupy a no-load position and to be deflected away from said position in response to the application of a load to the scale, comprising a plurality of contacts movable with said lever, a follow-up member carrying contacts cooperating respectively with said lever contacts, there being at least three respective pairs of said contacts and said pairs being spaced apart with said lever in its no-load position by a least, greater and greatest distance respectively providing for closing of the least spaced pair upon a small deflection of said lever and for closing of said greater and greatest spaced pairs in that order upon correspondingly greater deflection of said lever, an electric drive motor having an armature and a field winding and a shaft the rotation of which corresponds to the weight, means providing sources of relatively high voltage alternating current and relately low voltage direct current respectively, means connecting said motor shaft to move said follow-up member in response to the rotation of said shaft, circuit means including said greatest spaced pair of contacts connected to complete a high voltage alternating current circuit with said armature and said field winding in series for operating said motor at a highest speed, circuit means including said greater spaced pair of contacts and said high voltage alternating current source and resistors connected in series with said field winding and in shunt across said armature causing said motor to run at medium speed and with greater torque in response to closing of said greater spaced contacts, and circuit means including said least spaced contacts connecting said armature and said field winding in shunt and receiving power from said direct current source in response to closing of only said least spaced contacts.

References Cited in the file of this patent

UNITED STATES PATENTS

| Re.11,718 | Pieper | Feb. 21, 1899 |
| 1,274,209 | Tatum | July 30, 1918 |
| 2,040,072 | Brendel | May 12, 1936 |
| 2,326,386 | Newman | Aug. 10, 1943 |
| 2,615,148 | Critoph | Oct. 21, 1952 |